United States Patent
Hosabettu et al.

(10) Patent No.: US 9,928,106 B2
(45) Date of Patent: Mar. 27, 2018

(54) SYSTEM AND METHODS FOR DYNAMICALLY ASSIGNING CONTROL TO ONE OR MORE BOTS

(71) Applicant: Wipro Limited, Bangalore (IN)

(72) Inventors: Raghavendra Hosabettu, Bangalore (IN); Ramprasad Kanakatte Ramanna, Bangalore (IN); Raghottam Mannopantar, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 90 days.

(21) Appl. No.: 15/085,208

(22) Filed: Mar. 30, 2016

(65) Prior Publication Data

US 2017/0286155 A1    Oct. 5, 2017

(30) Foreign Application Priority Data

Mar. 29, 2016 (IN) .............................. 201641010899

(51) Int. Cl.
*G06F 9/46* (2006.01)
*G06F 9/48* (2006.01)
(Continued)

(52) U.S. Cl.
CPC .......... *G06F 9/4843* (2013.01); *G06F 3/0482* (2013.01); *G06F 3/04842* (2013.01);
(Continued)

(58) Field of Classification Search
CPC ................ G06F 9/4843; G06F 3/0482; G06F 17/30268; G06F 3/04842; G06Q 10/06398
See application file for complete search history.

(56) References Cited

U.S. PATENT DOCUMENTS 6,262,730 B1   7/2001   Horvitz et al.
7,613,670 B2   11/2009  Horvitz et al.
(Continued)

FOREIGN PATENT DOCUMENTS

WO   WO 98/55903   12/1998

OTHER PUBLICATIONS

UiPath Robotic Process Automation, A better and faster way to automate computer-centric repetitive and rule-based business processes, http://www.uipath.com/automate/automation-software, 12 pages (2004-2016).
(Continued)

*Primary Examiner* — Camquy Truong
(74) *Attorney, Agent, or Firm* — Finnegan, Henderson, Farabow, Garrett & Dunner LLP

(57) ABSTRACT

Method and system for dynamically assigning control to one or more BOTs to execute at least one task are disclosed. The method comprises tracking user actions on at least one graphical user interface to obtain tracking data, and analyzing the at least one graphical user interface using one or more computerized image processing techniques to obtain screen data, and comparing the tracking data and the screen data with one or more confirmatory predictors. Upon comparing a list of tasks are identified, and the list of tasks comprise the at least one task being performed by the user. Upon determining number of tasks less than a predefined threshold value, the list of tasks is provided to a user. Further, one or more BOTs configured to perform the at least one task are assigned control to execute the at least one task.

17 Claims, 6 Drawing Sheets

(51) Int. Cl.
- *G06F 3/0482* (2013.01)
- *G06F 3/0484* (2013.01)
- *G06F 17/30* (2006.01)
- *G06Q 10/06* (2012.01)

(52) U.S. Cl.
CPC . *G06F 17/30268* (2013.01); *G06Q 10/06398* (2013.01); *G06Q 10/063114* (2013.01)

(56) References Cited

U.S. PATENT DOCUMENTS

| | | | | |
|---|---|---|---|---|
| 9,632,995 | B2* | 4/2017 | Locke | G06F 17/243 |
| 2005/0147946 | A1 | 7/2005 | Ramamurthy et al. | |
| 2007/0214042 | A1 | 9/2007 | Dominowska | |
| 2011/0270794 | A1* | 11/2011 | Drory | G06Q 10/10 706/52 |
| 2014/0068512 | A1 | 3/2014 | Wong et al. | |
| 2016/0019484 | A1* | 1/2016 | Srivastava | G06Q 10/063118 705/7.17 |
| 2017/0109208 | A1* | 4/2017 | Sandstrom | G06F 9/5011 |

OTHER PUBLICATIONS

H. Kim et al., "User-centered approach to path planning of cleaning robots: analyzing user's cleaning behavior", HRI '07 Proceedings of the ACM/IEEE international conference on Human-robot interaction, pp. 373-380, http://dl.acm.org/citation.cfm?id=1228766, 2 pages (2007).

P. Fournier-Viger et al., "Learning procedural knowledge from user solutions to ill-defined tasks in a simulated robotic manipulator", Romero, et al.(eds.) Handbook of Educational Data Mining, pp. 451-465 (2010).

Extended Search Report from the European Patent Office in counterpart European Application No. 16186038.2, dated Mar. 6, 2017. 8 pages.

* cited by examiner

SYSTEM AND METHODS FOR DYNAMICALLY ASSIGNING CONTROL TO ONE OR MORE BOTS

TECHNICAL FIELD

This disclosure relates generally to process automation, and more particularly to system and methods method for dynamically assigning control to one or more BOTs.

BACKGROUND

Nowadays various applications have user interfaces designed to use specific functions and accomplish certain goals through a sequence of operations. Some of these processes/activities are repetitive in nature. Most of these processes/activities have associated rules and specific sequence of actions to be followed to complete the task, for example, use of a web application to book a travel ticket, using an SAP application to allocate resources, etc. Typically, various bots (also referred to as "BOTs" in this disclosure) are created and assigned tasks to automate such processes/activities. Once the bot (also referred to as "BOT" in this disclosure) is created for a particular task, the BOT can perform the task whenever an instruction is received to perform the task. However, in case, a user is performing a task, the BOTs are incapable of following a user's actions, system behavior, system response, error conditions, key board shortcuts, and extracting of a goal of the task therefrom.

SUMMARY

In one embodiment, a method for dynamically assigning control to one or more BOTs to execute at least one task is described. The method comprises tracking via a hardware processor user actions on at least one graphical user interface to obtain tracking data. The method further comprises analyzing via the hardware processor the at least one graphical user interface using one or more computerized image processing techniques to obtain screen data. The method further comprise comparing via the hardware processor the tracking data and the screen data with one or more confirmatory predictors obtained from a database. The method further comprises identifying via the hardware processor a list of tasks based on the comparing. The list of tasks comprises the at least one task being performed by the user. The method further comprises determining via the hardware processor whether number of tasks in the list of tasks is less than a predefined threshold value. The method further comprises providing, via the hardware processor, the list of tasks to the user, based on the determining, to identify the at least one task. The method further comprises ascertaining, via the hardware processor, the one or more BOTs configured to perform the at least one task. The method still further comprises assigning, via the hardware processor, control to the one or more BOTs to execute the at least one task.

In another embodiment, system for dynamically assigning control to one or more BOTs to execute at least one task is disclosed. The system includes at least one processors and a computer-readable medium. The computer-readable medium stores instructions that, when executed by the at least one processor, cause the at least one processor to perform operations comprising, tracking user actions on at least one graphical user interface to obtain tracking data. The operations further comprising analyzing the at least one graphical user interface using one or more computerized image processing techniques to obtain screen data. The operations further comprising, comparing the tracking data and the screen data with one or more confirmatory predictors obtained from a database. The operations further comprising a list of tasks based on the comparing. The list of tasks comprises the at least one task being performed by the user. The operations further comprising, determining whether number of tasks in the list of tasks is less than a predefined threshold value. The operations further comprising, providing the list of tasks to the user, based on the determining, to identify the at least one task. The operations further comprising ascertaining, via the hardware processor, the one or more BOTs configured to perform the at least one task. The operations still further comprising, assigning via the hardware processor, control to the one or more BOTs to execute the at least one task.

In another embodiment, a non-transitory computer-readable storage medium for dynamically assigning control to one or more BOTs to execute at least one task is disclosed, which when executed by a computing device, cause the computing device to perform operations comprising tracking user actions on at least one graphical user interface to obtain tracking data. The operations further comprising analyzing the at least one graphical user interface using one or more computerized image processing techniques to obtain screen data. The operations further comprising, comparing the tracking data and the screen data with one or more confirmatory predictors obtained from a database. The operations further comprising a list of tasks based on the comparing. The list of tasks comprises the at least one task being performed by the user. The operations further comprising, determining whether number of tasks in the list of tasks is less than a predefined threshold value. The operations further comprising, providing the list of tasks to the user, based on the determining, to identify the at least one task. The operations further comprising ascertaining, via the hardware processor, the one or more BOTs configured to perform the at least one task. The operations still further comprising, assigning via the hardware processor, control to the one or more BOTs to execute the at least one task.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide systems and methods for dynamically assigning control to one or more BOTs. The present subject matter monitor actions of a user to identify one or more tasks the user is going to perform. Once the task is identified, the present subject matter dynamically assigns control to active BOTs to execute the one or more tasks to be performed by the user. The active BOTs may be understood as BOTs which are trained to perform a particular task and have a predefined maturity level. Maturity level for the BOT may be a particular level of training that the BOT has received, beyond which the BOT may be used for performing the tasks, the BOT has been trained for. Further, the present subject matter may provide an optimal path, to the user, to execute the one or more tasks, in case the user refuses to take assistance from the BOTs.

Figure 1:
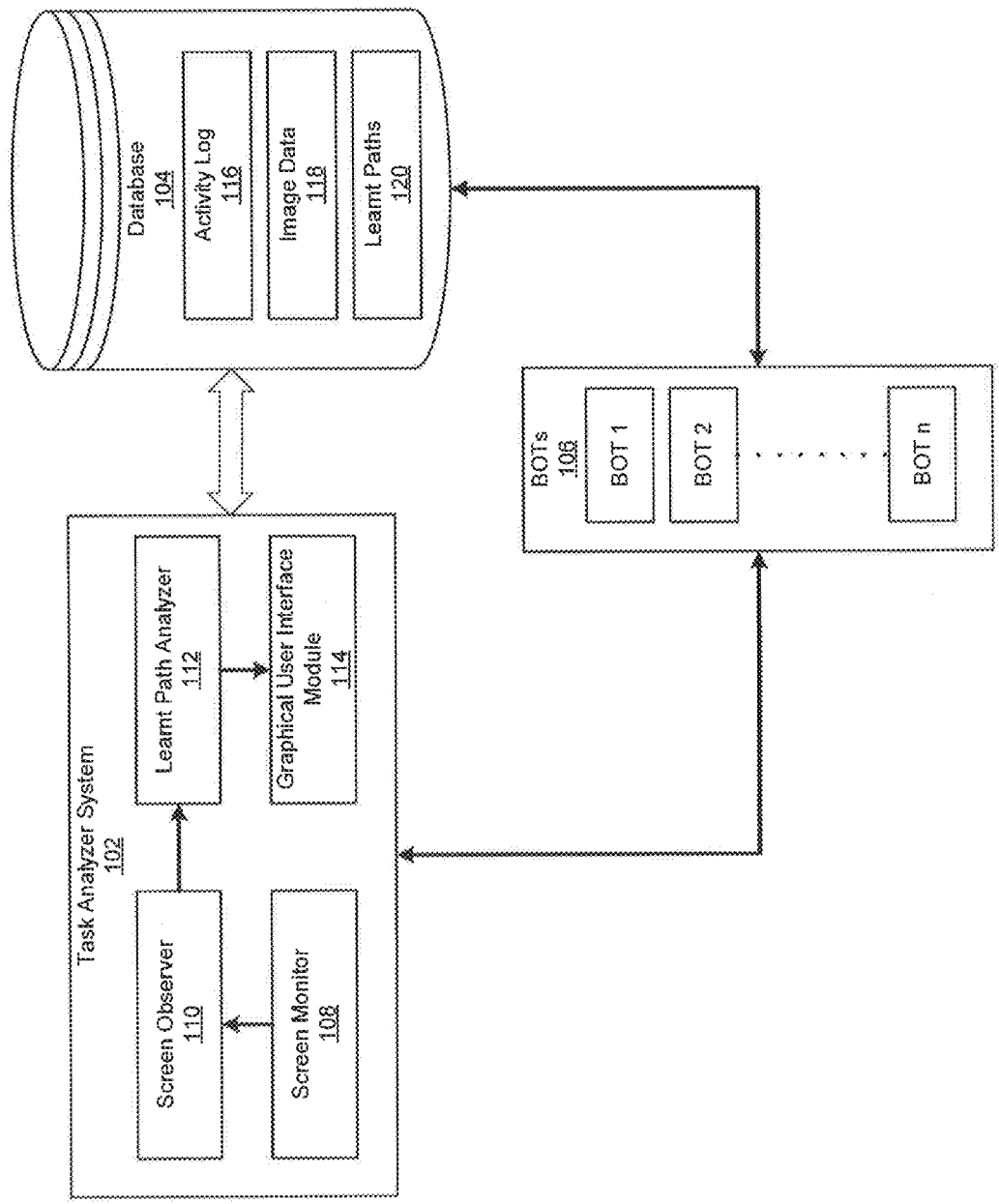
FIG. 1 illustrates an exemplary task analyzer system for dynamically assigning control to one or more BOTs to execute at least one task, in accordance with some embodiments of the present disclosure.

FIG. 1 illustrates an exemplary network environment 100 comprising a task analyzer system 102, in accordance with some embodiments of the present disclosure. As shown in FIG. 1, the task analyzer system 102 is communicatively coupled to a database 104 and BOTs 106. The task analyzer system 102 comprises a screen monitor 108, a screen observer 110, a learnt path analyzer 112, and a graphical user interface module 114.

As shown in FIG. 1, the database 104 comprises activity log 116, image data 118, and learnt paths data 120. In an example, an activity log 116 may store parameters, actions, activities and flow order associated with each image of a graphical user interface (GUI) on which a user is performing some operations. It may be noted that the GUI is interchangeably referred to as screen in the present disclosure. Further, the image data 118 may store images of all screens, screen components, popup screens, information messages or error messages. The learnt paths data 120 may store learnt paths to perform various tasks. In an example, the learnt paths data 120 may comprise screen details and confirmatory predictors for trained BOTs. In an example, confirmatory predictors may include unique combinations of at least one of an event, a position, an order, objects, a relative timeline in the at least one graphical user interface of a display unit, or inputs from peripheral devices. The peripheral devices from which user may input may include but not limited to mouse, keyboard, monitor, printer and scanner.

Figure 2:
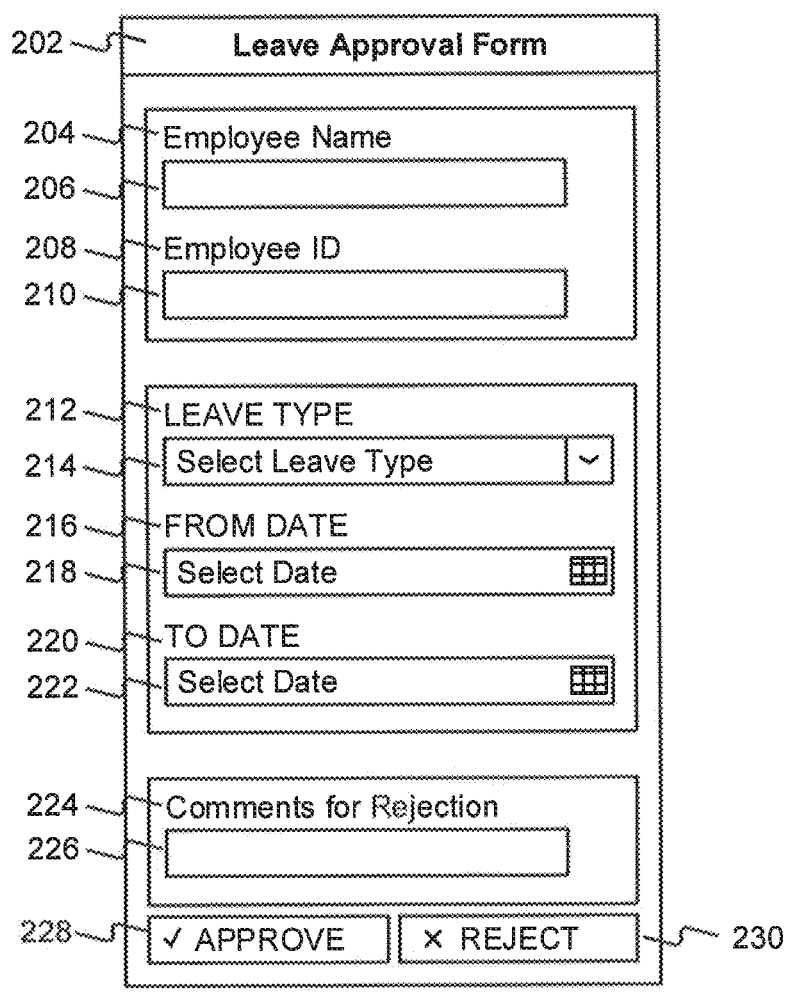
FIG. 2 illustrates an exemplary graphical user interface, in accordance with some embodiments of the present disclosure.

FIG. 2 illustrates an exemplary graphical user interface, in accordance with some embodiments of the present disclosure. In some embodiments, a graphical user interface module 114 may display a leave application form 202. When a user has to apply for leaves, the task of applying for leaves is performed by the user through the leave application form. The form may include various screen objects, such as labels 204, 208, 212, 216, 220, and 224. In addition, the form may include elements that perform functions upon user activation, such as drop-down boxes (e.g., 214), date selectors (e.g., 218, 222), buttons (228, 230), radio buttons, and text boxes (e.g., 206, 210, 226), etc.

Further, the task analyzer system may communicate with the BOTs 106 to dynamically assign the control and get the one or more tasks executed. The BOTs 106 comprises various BOTs, such as BOT-1, BOT-2 . . . , and BOT-n. Each of the BOTs 106 is assigned to do a particular task. In an example, the BOT 106 may be understood as automated processes to execute the tasks. Typically, BOTs 106 perform tasks that are both simple and structurally repetitive, at a much higher rate than humans. For example, an Internet BOT, also known as web robot, WWW robot or simply a BOT, is a software application that runs automated tasks (scripts) over the Internet. BOTs may be designed for understanding the order and flow of activities at each stage of the process, generating its own rules automatically and for validating and self-learning the entire workflows.

Further, the task analyzer system 102 may communicate to the database 104, and the BOTs 106 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

Further, hereinafter, the task analyzer system 102 may be interchangeably referred to as the system 102. The system 102 may be implemented on variety of computing systems. Examples of the computing systems may include a laptop computer, a desktop computer, a tablet, a notebook, a workstation, a mainframe computer, a server, a network server, and the like. Although the description herein is with reference to certain computing systems, the systems and methods may be implemented in other computing systems, albeit with a few variations, as will be understood by a person skilled in the art.

In operations, to assign control to one or more BOTs 106 to execute at least one task, the screen monitor 108 may track user actions on the GUI, also referred to as screen herein, to obtain tracking data. The user actions may include various actions performed by the user on the screen in order to complete a particular task. The tracking data may include actions and sequence of actions performed on the screen by the user.

In an example, to obtain the tracking data, the screen monitor 108 may capture various screens that a user navigates through. The screen monitor 108 may capture the action, activities and order of actions performed by the user. In an example, the screen monitor 108 may use image processing techniques, like Optical Character Recognition (OCR) to get contours, edges and deducing various information from screen and labeling same.

Further, the screen monitor 108 may analyze the screens/GUIs, on which the user is performing actions, to obtain screen data. In an example, the screen monitor 108 may obtain the screen data through screen title and mouse pointer position on the screen. The screen may include objects on the screen such as Images, Buttons, Icons, Shortcut Keys, Controls such as Textboxes, Labels, Dropdowns, Hyperlinks, etc, as shown in FIG. 2. The screen data may be stored in an organizing map table in the image data 118. The organizing map table a structured system for storing such information, and may store details of all the screens as navigation takes place, and may also be accessed by the screen observer 110 from time to time. Further, operations performed by the screen monitor 108 are discussed in more details in conjunction with FIG. 5

Figure 3:
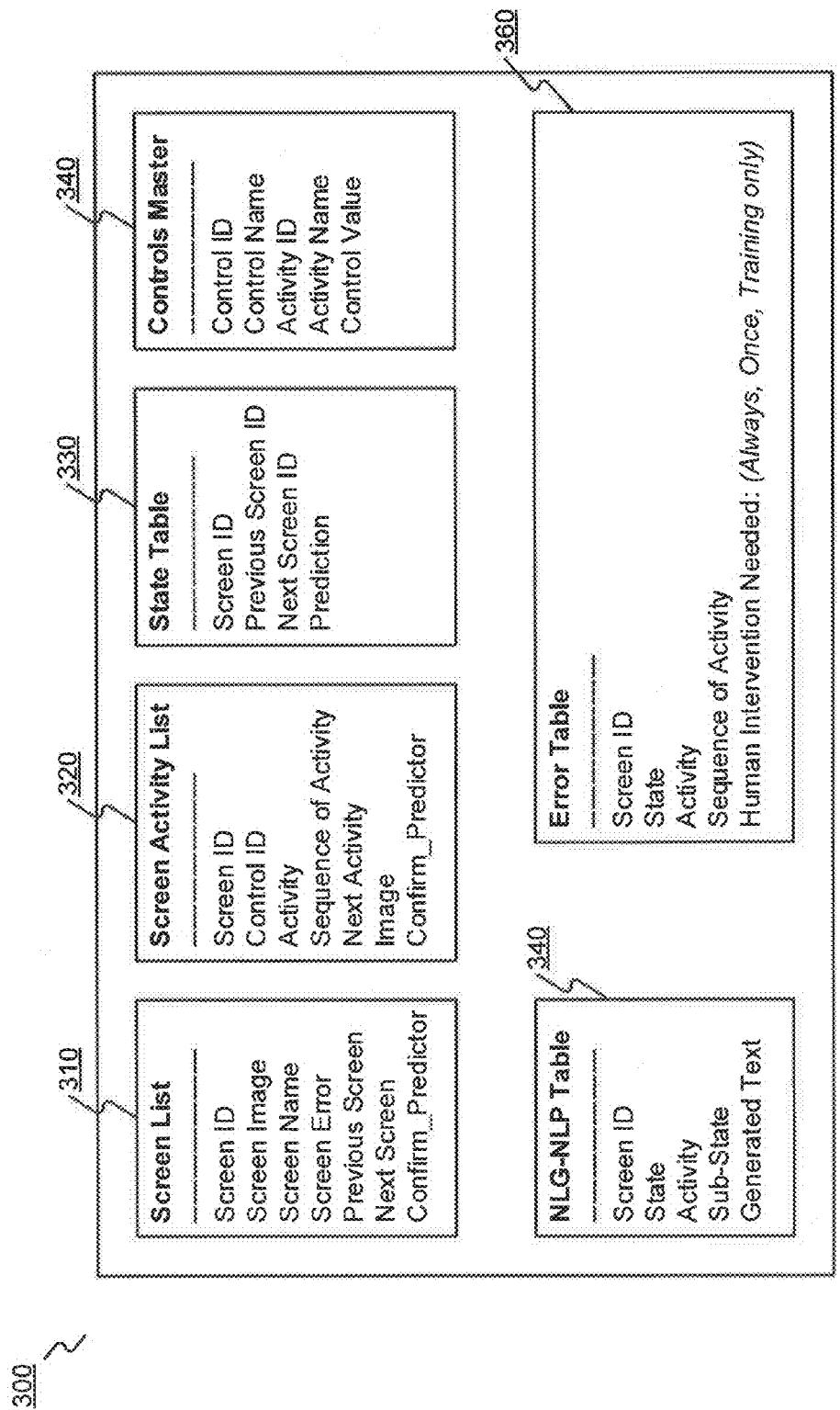
FIG. 3 illustrates a functional block diagram of an organizing map table, in accordance with some embodiments of the present disclosure

FIG. 3 illustrates functional block diagram of the organizing map table, in accordance with some embodiments of the present disclosure. The organizing map table comprises a screen table 330 along with various information such as, screen list 310, screen activity list, 320, and control masters 340. The organizing map table is obtained by analyzing the screen data and the tracking data. Further, the organizing map table may be used while determining a list of tasks based on confirmatory predictors.

In an example, an organizing map table may organize the screens/objects of any enterprise process, by capturing the user activities performed and the sequences of action. For example, the organizing map table 300 may include the screen list 310, listing all screens (or all screens accessed during the course of the process flow) in an application with the graphical user interface 114. Further, the organizing map table 300 may include the screen activity list 320, which may log all user interaction with the screens. For example, the screen activity list 320 may list a screen ID, a control ID (e.g., representing a textbox, label, button, etc.), an activity (e.g., right-click, click, text input, radio button selection, etc.), a sequence of activity (e.g., in order of time or in order of logical sequence), a next activity (e.g., in the form of a linked list), an image (e.g., corresponding to the particular control being activated), and the confirmatory predictor. Also, the organizing map table 300 may include the state table 330, which may store a list of states. For example, the state table 330 may store a screen ID, a previous screen ID, a next screen ID, and/or a prediction for any of the above parameters. Further, the organizing map table 300 may include a controls master 340, which may store including a control ID, a control name, an activity ID, an activity name (e.g., click, right-click, mouseover, textbox input, etc.), and a control value. The organizing map table 300 may include a natural language generation-natural language processing ("NLG-NLP") table 350, which may store parameters such as screen ID, state, activity, sub-state, and generated text, etc. Finally, the organizing map table 300 may include an error table 360, which may log parameters such as screen ID, state (e.g., when error occurred), activity (e.g., when error occurred), sequence of activity (e.g., that led to the error), and any human intervention needed to exit from error condition.

Referring to FIG. 1, once the screen data and the tracking data are obtained by the screen monitor 108, the screen observer 110 may receive both the screen data and the tracking data. The tracking data may be stored in the activity log 116, and accessed by the screen observer 110 from time to time.

Upon aggregating the tracking data and the screen data by the screen observer 110, both the data may be received by the learnt path analyzer 112. The learnt path analyzer 112 may compare the tracking data and the screen data with the confirmatory predictors to ascertain the task, the user may want to perform. In an example, a predefined limit may be set, for the confirmatory predictors, which may be number of confirmatory predictors required to be mapped to decide the task, to be performed by the user. If the comparison shows a result, that is the number of confirmatory predictors matching the screen data is more than the predefined limit, then the task may be confirmed. Otherwise, the system 102 may wait for further details or user actions or screen details or tracking data, in order to detect the task to be performed by the user.

Further, the learnt path analyzer 112 determines whether the number of tasks identified is less than a predefined threshold value. In an example, the predefined threshold value may be called Maximum Tasks Identified Threshold. The Maximum Task Identified Threshold may be set as three. If the number of tasks identified by the learnt path analyzer 112 is equal to or more than three, then the learnt path analyzer 112 may not proceed with further steps, and waits for further screen data and tracking data. However, if the Maximum Task Identified Threshold is less than three, then the learnt path analyzer 112 may display the identified goals on a display device with the help of the graphical user interface module 114, for user selection and validation of the task, that is the task the user may want to perform. The tasks displayed to the user by the graphical user interface 114, may also be referred to as a list of tasks. The list of tasks includes the number of tasks identified by the system 102, that the user may want to perform. However the list of tasks, also may contain tasks that the user may not want to perform, however they have been identified by the system 102, following the above mentioned steps.

The graphical user interface module 114 via the GUI, may receive the user input and send it further to the learnt path analyzer 112. In an example three tasks identified by the learnt path analyzer 112 may be displayed by the graphical user interface module 114 to the user as options that is the user may choose or select any one the tasks from the options that the user may want to perform. This user selection or selection by the user may then be sent to the learnt path analyzer 112.

Upon receiving the user selection, the learnt path analyzer 112, may determine one or more BOTs to execute the at least one task. In an example, the learnt path analyzer 112 may identify active BOTs 106, that have been pre-trained to perform one dedicated task and have a predefined maturity level, based on the user selection. Maturity level for the BOT may be a particular level of training that the BOT has received, beyond which the BOT may be used for performing the one dedicated task. In an example, the active BOTs, may be the BOTs 106 that are trained to perform only one task each. The active BOTs may contain various paths to perform a particular task, but they contain only one optimized path to perform the particular task, and they are available to perform the task and not under training.

Once the Active BOTs are identified, the graphical user interface module 114 may display to the user, that the task can be taken over and completed by the system 102. In an example, graphical user interface module 114 may display to the user that the system 102 may take over and complete the task. If the user input is affirmative, then the learnt path analyzer 112 may dynamically assign control to one of the identified active BOTs to execute the task, which was being performed by the user. In another example, the user may not choose to hand over the task to the system 102, and in such a situation, the graphical user interface module 114 may display to the user the optimized path to perform the task.

In a further example, the user may not choose any of the options displayed by the graphical user interface module 114. In such a situation, the graphical user interface module 114 may display the optimized paths for each of the tasks identified by the learnt path analyzer 112 and presented to the user.

Figure 4:
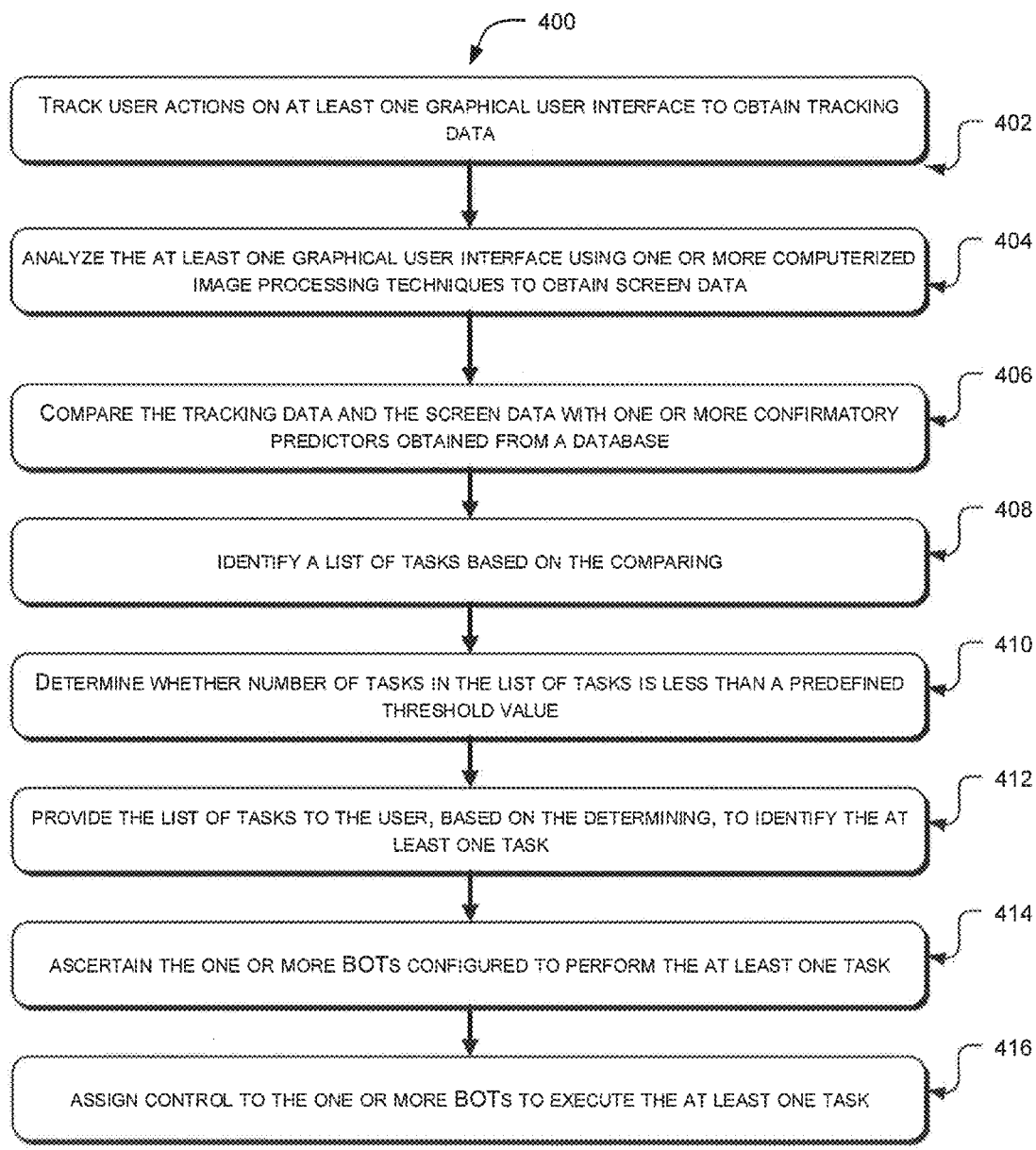
FIG. 4 illustrates an exemplary method for dynamically assigning control to one or more BOTs to execute at least one task, in accordance with some embodiments of the present disclosure.

FIG. 4 illustrates an exemplary method for dynamically assigning control to one or more BOTs 106 to execute at least one task, in accordance with some embodiments of the present disclosure.

Figure 5:
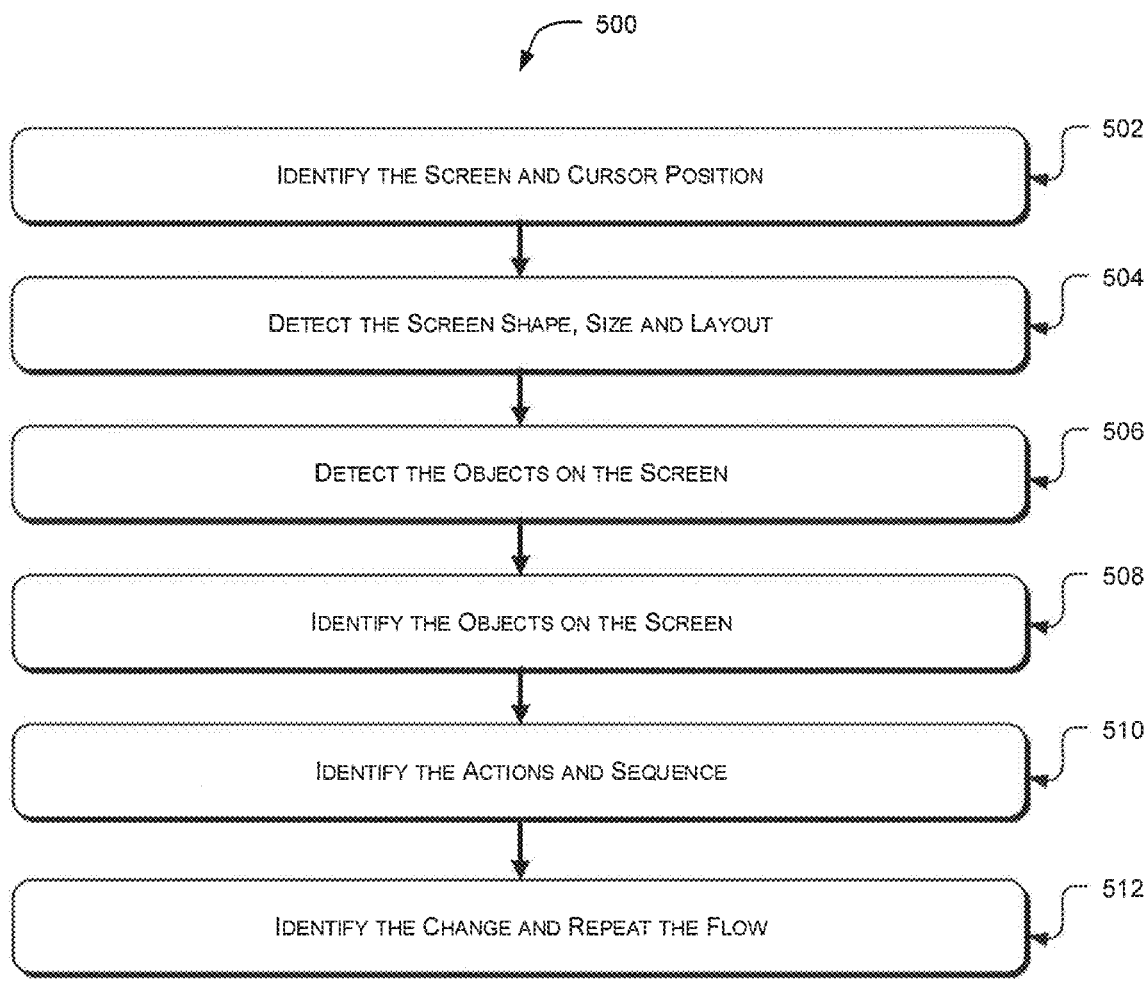
FIG. 5 illustrates an exemplary method for performing screen analysis, in accordance with some embodiments of the present disclosure.

FIG. 5 illustrates an exemplary method for performing screen analysis, in accordance with some embodiments of the present disclosure.

The methods 400 and 500 may be described in the general context of computer executable instructions. Generally, computer executable instructions can include routines, programs, objects, components, data structures, procedures, modules, and functions, which perform particular functions or implement particular abstract data types. The methods 400 and 500 may also be practiced in a distributed computing environment where functions are performed by remote processing devices that are linked through a communication network. In a distributed computing environment, computer executable instructions may be located in both local and remote computer storage media, including memory storage devices.

Reference is made to FIGS. 4 and 5, the order in which the methods 400 and 500 are described is not intended to be construed as a limitation, and any number of the described method blocks can be combined in any order to implement the methods 400 and 500 or alternative methods. Additionally, individual blocks may be deleted from the methods 400 and 500 without departing from the spirit and scope of the subject matter described herein. Furthermore, the methods 400 and 500 can be implemented in any suitable hardware, software, firmware, or combination thereof.

With reference to FIG. 4, at block 402, user actions on the graphical user interface 114 are tracked to obtain tracking data. The user actions may comprises actions, such as selection of an object, click on a screen, entering data in an input field in the screen, and movement of cursor. In an example, the screen observer 110 may track the user actions and obtain tracking data by analyzing the user actions. In an example, tracking data may comprise, data related to actions performed, by the user, on the objects present in the at least one graphical user interface and also sequence of the actions performed.

At block 404, the graphical user interface is analyzed using one or more computerized image processing techniques to obtain screen data. The screen data may comprise objects present in the at least one graphical user interface. The object may include images, buttons, icons, shortcut keys, controls, textboxes, labels, dropdowns, or hyperlinks. In an example, the screen monitor 108 may analyze the graphical user interface by employing image processing techniques to obtain the screen data. In another example, the screen monitor 108 may use screen title and cursor position on the screen to obtain the screen data. Analyzing of the graphical user interface to obtain the screen data is discussed in more detail in conjunction with FIG. 3.

At block 406, the tracking data and the screen data are compared with confirmatory predictors. The confirmatory predictors are obtained from the database and may be understood as unique combinations of at least one of an event, a position, an order, objects, device type like mouse, keyboard, hand gesture, or any other input or a relative timeline in the at least one graphical user interface of display unit. In an example, the learnt path analyzer 112 may compare the tracking data and the screen data with the confirmatory predictors.

At block 408, a list of tasks are identified based on the comparing. In an example, the learnt path analyzer 112 may identify the list of tasks by comparing the tracking data and the screen data with the confirmatory predictors. The list of tasks may comprise tasks that the user may be performing based on the comparing. Further, it may be noted that the list of tasks may comprise additional tasks that the user is not performing and out of which at least one task may be performed by the user.

In an example, a threshold may be defined that is if a certain number or percentage of confirmatory predictors match the screen data and the tracking data, then tasks to be performed by the user may be identified by the system 102.

At block 410, it is determined whether number of tasks identified is less than a predefined threshold value or not. In an example, the learnt path analyzer 112 may determine whether the number of tasks identified is less than the predefined threshold value. In case, the learnt path analyzer 112 determines that the number of tasks is greater than the predefined threshold value, then learn path analyzer 112 may instruct the screen monitor 108 to perform the method again. On the other hand, if the learnt path analyzer 112 determines that the number of tasks is less than the predefined threshold value, the learnt path analyzer 112 may proceed to step disclosed in block 212. In an example, the predefined threshold value may be assigned a value '3'. In such cases, if the tasks identified are three or more than three, then the learnt path analyzer 112 may request the screen monitor 108 and the screen observer 110 for updated screen data and tracking data.

At block 412, the list of tasks are provided to the user based on determining. In an example, the graphical user interface 114 may display the tasks identified as options to the user, for validation and selection by the user. In an example, the graphical user interface 114 may display two tasks identified by the learnt path analyzer 112. The graphical user interface module 114 may receive one user selection or one selection from the user, denoting the task to be performed by the user. This selection may then be received by the learnt path analyzer 112.

At block 414, one or more BOTs 106 may be ascertained to perform the at least one task. In an example, the learnt path analyzer 112 may ascertain the BOT 106 that may be configured to perform the specific task. In an example, the learnt path analyzer 112 may find an active BOT that may have been configured to perform the particular task determined by the user. In an example, an active BOT may be a BOT 106 that has been configured to perform a particular task, and has been trained in multiple paths to perform the task, including one optimized path. In a further example, the active BOT may be available to perform the particular task, and has reached a certain level of maturity, or may not be under training. Maturity level for the BOT may be a particular level of training that the BOT has received, beyond which the BOT may be used for performing one dedicated task.

At block 416, the learnt path analyzer 112 may assign the active BOT to perform the selected task for the user. In an example, the learnt path analyzer 112 may prompt the user via the graphical user interface 114 seeking permission to perform the task for the user. On receiving the permission from the user, via the graphical user interface 114, the learnt path analyzer 112 may assign an active BOT to perform the task. In another example, if the user denies permission, then the learnt path analyzer 112 may display the optimized path to perform the task via the graphical user interface module 114.

In yet another example, if the user does not choose any of the tasks presented as options to be validated and selected, by the learnt path analyzer 112 via the graphical user interface 114 at block 412, may display the optimized paths for the options displayed to the user via the graphical user interface 114.

Reference is made to FIG. 5 to explain operations performed by the screen monitor 108 to obtain the screen data. In an example, the screen monitor 108 may use image processing techniques (e.g., edge detection, Optical Character Recognition (OCR)) to get contours and edges, and deducing various elements from the screen and labeling them. In some embodiments, the screen monitor 108 may create database tables of screen elements, user activity, and action order. Based on this, the screen monitor 108 may generate a self-organizing map with decision points reflecting the process flow.

For example, at block 502, the screen monitor 108 may identify the graphical user interface 114 screen, and identify the cursor position (e.g., of a mouse connected to the user device).

At block 504, the screen monitor 108 may detect the screen shape, size, and layout.

At block 506, the screen monitor 108 may detect the objects (e.g., text boxes, labels, button, drop-down lists, sliders, etc.) present in the screen of the graphical user interface.

At block 508, the screen monitor 108 may identify the objects on the screen (e.g., by determining the function(s) associated with the objects).

At block 510, the screen monitor 108 may monitor the user's actions, and identify the user actions (text input, button click, etc.) and sequence of actions.

At block 512, the screen monitor 108 may identify any change in the user actions and sequence for a given screen compared to previous monitoring trials where the user utilized the same screen. In another example, the screen monitor 108 may repeat the process flow performed by the user.

Computer System

Figure 6:
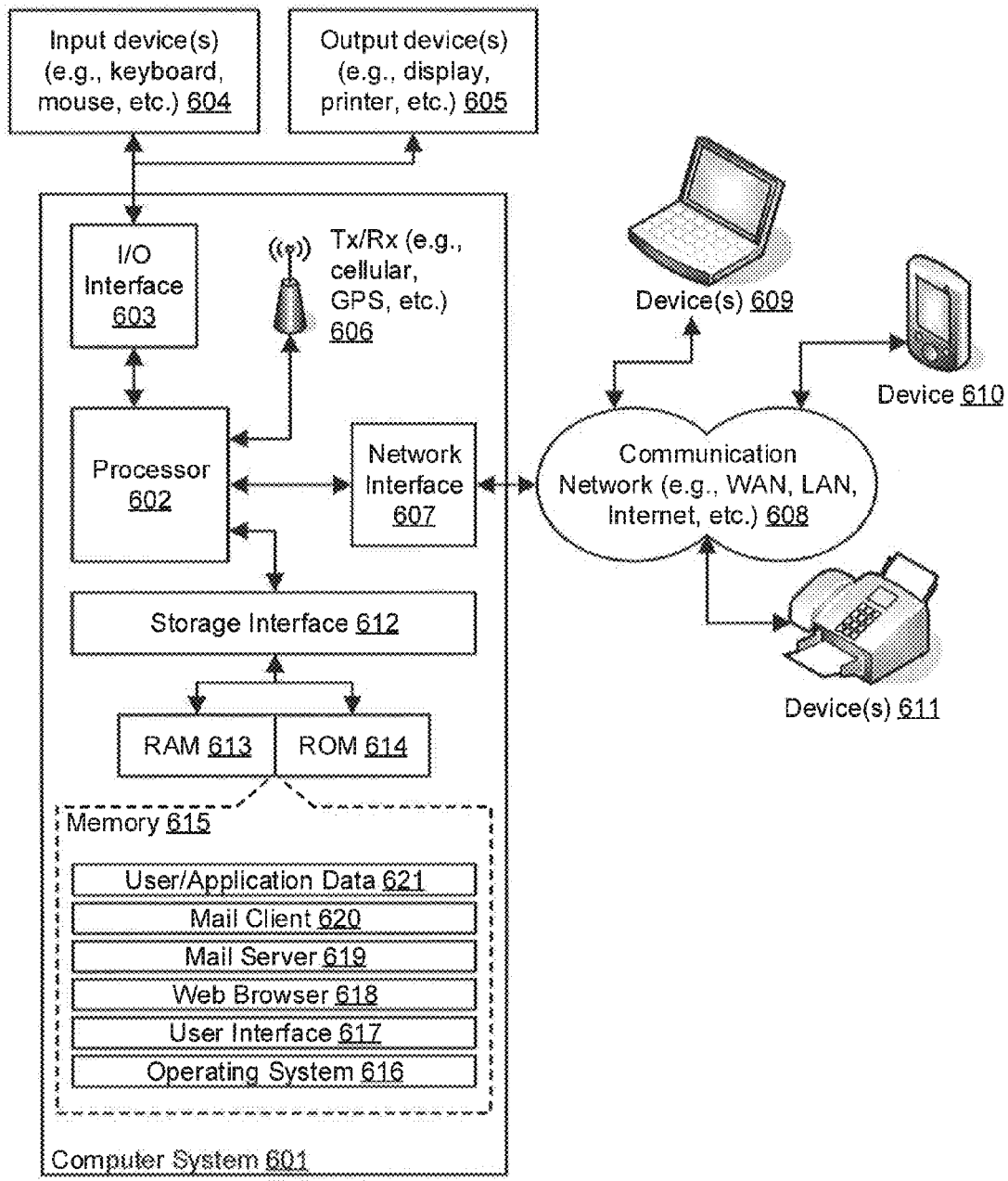
FIG. 6 is a block diagram of an exemplary computer system for implementing embodiments consistent with the present disclosure.

FIG. 6 is a block diagram of an exemplary computer system for implementing embodiments consistent with the present disclosure. Variations of computer system 601 may be used for implementing the devices and systems disclosed herein. Computer system 601 may comprise a central processing unit ("CPU" or "processor") 602. Processor 602 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 610, 611, and 612. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 616, user interface application 617, web browser 618, mail server 616, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 901 may implement a mail client 920 stored program component. The mail client may be a mail viewing application, such as Apple Mail, Microsoft Entourage, Microsoft Outlook, Mozilla Thunderbird, etc.

In some embodiments, computer system 901 may store user/application data 921, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described system and methods for dynamically assigning control to one or more BOTs to execute at least one task. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A method for dynamically assigning control to one or more bots to execute at least one task, the method comprising:
 tracking, via a hardware processor, user actions on at least one graphical user interface to obtain tracking data;
 analyzing, via the hardware processor, the at least one graphical user interface using one or more computerized image processing techniques to obtain screen data;
 comparing, via the hardware processor, the tracking data and the screen data with one or more confirmatory predictors obtained from a database;

identifying, via the hardware processor, a list of tasks based on the comparing wherein the list of tasks comprises the at least one task being performed by the user;

determining, via the hardware processor, whether number of tasks in the list of tasks is less than a predefined threshold value;

providing, via the hardware processor, the list of tasks to the user, based on the determining, to identify the at least one task;

ascertaining, via the hardware processor, the one or more bots configured to perform the at least one task; and assigning, via the hardware processor, control to the one or more bots to execute the at least one task, wherein assigning the control to the one or more bots comprises:

seeking, via the hardware processor, a user permission to identify whether to provide the control to the one or more bots;

providing, via the hardware processor, the control to the one or more bots to perform the at least one task upon receiving the user permission from the user; and providing, via the hardware processor, one or more optimum paths to the user to perform the at least one task in absence of the user permission.

2. The method of claim 1, wherein the tracking data comprise data related to actions performed, by the user, on the objects present in the at least one graphical user interface and sequence of the actions performed.

3. The method of claim 1, wherein the screen data comprise objects in the at least one graphical user interface, and wherein the objects is at least one of images, buttons, icons, shortcut keys, controls, textboxes, labels, dropdowns, or hyperlinks.

4. The method of claim 1, wherein each of the one or more confirmatory predictors comprise unique combinations of at least one of an event, a position, an order, objects, a relative timeline in the at least one graphical user interface of a display unit, or inputs from peripheral devices.

5. The method of claim 1, wherein providing the list of tasks to the user further comprises:

displaying, by the hardware processor, the list of tasks on the at least one graphical user interface of a display unit; and receiving, by the hardware processor, a user selection indicating the at least one task being performed by the user.

6. The method of claim 1, wherein ascertaining the one or more bots further comprises identifying, by the hardware processor, at least one active bot based on availability and the at least one task to be performed, and wherein each of the at least one active bot has a predefined maturity level.

7. A system for adaptive process automation, comprising:
a hardware processor; and a memory storing instructions executable by the hardware processor for:
tracking user actions on at least one graphical user interface to obtain tracking data;
analyzing the at least one graphical user interface using one or more computerized image processing techniques to obtain screen data;
comparing the tracking data and the screen data with one or more confirmatory predictors obtained from a database;
identifying a list of tasks based on the comparing, wherein the list of tasks comprises the at least one task being performed by the user;

determining whether number of tasks in the list of tasks is less than a predefined threshold value;

providing the list of tasks to the user, based on the determining, to identify the at least one task;

ascertaining the one or more bots configured to perform the at least one task; and assigning control to the one or more bots to execute the at least one task, wherein the assigning control to one or more bots comprises:

seeking a user permission to identify whether to provide the control to the one or more bots;

providing the control to the one or more bots to perform the at least one task upon receiving the user permission from the user; and providing one or more optimum paths to the user to perform the at least one task in absence of the user permission.

8. The method of claim 7, wherein the tracking data comprise data related to actions performed, by the user, on the objects present in the at least one graphical user interface and sequence of the actions performed.

9. The method of claim 7, wherein the screen data comprise objects in the at least one graphical user interface, and wherein the objects is at least one of images, buttons, icons, shortcut keys, controls, textboxes, labels, dropdowns, or hyperlinks.

10. The method of claim 7, wherein each of the one or more confirmatory predictors comprise unique combinations of at least one of an event, a position, an order, objects, a relative timeline in the at least one graphical user interface of a display unit, or inputs from peripheral devices.

11. The method of claim 7, wherein providing the list of tasks to the user further comprises:

displaying, by the hardware processor, the list of tasks on the at least one graphical user interface of a display unit; and receiving, by the hardware processor, a user selection indicating the at least one task being performed by the user.

12. The method of claim 7, wherein ascertaining the one or more bots further comprises identifying, by the hardware processor, at least one active bot based on availability and the at least one task to be performed, and wherein each of the at least one active bot has a predefined maturity level.

13. A non-transitory computer-readable medium storing instructions for dynamically assigning control to one or more bots to execute at least one task, wherein upon execution of the instructions by one or more processors, the processors perform operations comprising:

tracking user actions on at least one graphical user interface to obtain tracking data;

analyzing the at least one graphical user interface using one or more computerized image processing techniques to obtain screen data;

comparing the tracking data and the screen data with one or more confirmatory predictors obtained from a database;

identifying a list of tasks based on the comparing, wherein the list of tasks comprises the at least one task being performed by the user;

determining whether number of tasks in the list of tasks is less than a predefined threshold value;

providing the list of tasks to the user, based on the determining, to identify the at least one task;

ascertaining the one or more bots configured to perform the at least one task; and assigning control to the one or more bots to execute the at least one task, wherein assigning the control to the one or more bots comprises:
  seeking a user permission to identify whether to provide the control to the one or more bots;
  providing the control to the one or more bots to perform the at least one task upon receiving the user permission from the user; and
  providing one or more optimum paths to the user to perform the at least one task in absence of the user permission.

14. The medium of claim 13, wherein the tracking data comprise data related to actions performed, by the user, on the objects present in the at least one graphical user interface and sequence of the actions performed and the screen data comprise objects in the at least one graphical user interface, and wherein the objects is at least one of images, buttons, icons, shortcut keys, controls, textboxes, labels, dropdowns, or hyperlinks.

15. The medium of claim 13, wherein each of the one or more confirmatory predictors comprise unique combinations of at least one of an event, a position, an order, objects, a relative timeline in the at least one graphical user interface of a display unit, or inputs from peripheral devices.

16. The medium of claim 13, wherein providing the list of tasks to the user further comprises:
  displaying, by the hardware processor, the list of tasks on the at least one graphical user interface of a display unit; and
  receiving, by the hardware processor, a user selection indicating the at least one task being performed by the user.

17. The medium of claim 13, wherein ascertaining the one or more bots further comprises identifying, by the hardware processor, at least one active bot based on availability and the at least one task to be performed, and wherein each of the at least one active bot has a predefined maturity level.

\* \* \* \* \*